United States Patent
Kimura et al.

(10) Patent No.: US 9,871,485 B2
(45) Date of Patent: Jan. 16, 2018

(54) STEPPER MOTOR DRIVER CIRCUIT

(71) Applicant: Kabushiki Kaisha Toshiba, Minato-ku, Tokyo (JP)

(72) Inventors: Hideki Kimura, Yokohama Kanagawa (JP); Katsunori Sasaki, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/155,404

(22) Filed: May 16, 2016

(65) Prior Publication Data

US 2016/0352271 A1 Dec. 1, 2016

(30) Foreign Application Priority Data

May 25, 2015 (JP) ................. 2015-105537

(51) Int. Cl.
*H02P 8/00* (2006.01)
*G01R 27/28* (2006.01)
*H02P 29/50* (2016.01)
*H02P 8/18* (2006.01)
*H02P 8/34* (2006.01)

(52) U.S. Cl.
CPC .............. *H02P 29/50* (2016.02); *H02P 8/18* (2013.01); *H02P 8/34* (2013.01)

(58) Field of Classification Search
CPC ........................................................ H02P 8/12
USPC ........................................................ 318/696
See application file for complete search history.

(56) References Cited

U.S. PATENT DOCUMENTS

| | | | | |
|---|---|---|---|---|
| 2010/0320955 A1* | 12/2010 | Ando | ......... | H02P 8/38 318/696 |
| 2012/0104985 A1* | 5/2012 | Yamada | ......... | H02P 8/34 318/696 |
| 2013/0221894 A1* | 8/2013 | Larsson | ......... | H02P 6/182 318/696 |

FOREIGN PATENT DOCUMENTS

| | | |
|---|---|---|
| JP | 2007-202306 A | 8/2007 |
| JP | 2008-061439 A | 3/2008 |
| JP | 2008-161028 A | 7/2008 |

* cited by examiner

*Primary Examiner* — Bentsu Ro
*Assistant Examiner* — Zemenay Truneh
(74) *Attorney, Agent, or Firm* — White & Case LLP

(57) ABSTRACT

The stepper motor driver circuit controls driving of a stepper motor. The stepper motor driver circuit generates a driving current having a pseudo-sinusoidal waveform that varies stepwise every one period of a reference clock signal and makes the waveform of the driving current vary in response to a measurement value of an exciting voltage on a coil of the stepper motor at a time when the driving current is zero.

17 Claims, 5 Drawing Sheets

STEPPER MOTOR DRIVER CIRCUIT

CROSS-REFERENCE TO RELATED APPLICATION

This application is based upon and claims the benefit of priority from the prior Japanese Patent Application No.2015-105537, filed on May 25, 2015, the entire contents of which are incorporated herein by reference.

BACKGROUND

Field

Embodiments described herein relate generally to a stepper motor driver circuit.

Background Art

Stepper motors are characterized by the ease of open-loop control and high holding torque, and a lot of stepper motors are used in a wide variety of applications.

However, the stepper motors have problems of noise during driving and driving efficiency.

Micro-step driving is an existing technique to reduce the vibration of the stepper motor.

The micro-step driving is a technique of smoothly driving the stepper motor by supplying a stepwise driving current that varies in smaller steps to the stepper motor. In particular, a driving current having a pseudo-sinusoidal waveform is close to a sinusoidal waveform, which is ideal for driving of the stepper motor.

The timing of transition between current steps is controlled in synchronization with a reference clock signal. When the stepper motor is driving at a constant number of revolutions, the frequency of the reference clock signal needs to be increased as the steps of the micro-step driving becomes smaller.

This leads to an excessive load on a mechanism control unit (MCU) that outputs the reference clock signal, and there is a limit to the vibration isolation based on the micro-step driving.

DETAILED DESCRIPTION

A stepper motor driver circuit according to an embodiment controls driving of a stepper motor. The stepper motor driver circuit generates a driving current having a pseudo-sinusoidal waveform that varies stepwise every one period of a reference dock signal and makes the waveform of the driving current vary in response to a measurement value of an exciting voltage on a coil of the stepper motor at a time when the driving current is zero.

In the following, an embodiment will be described with reference to the drawings.

(First Embodiment)

Figure 1:
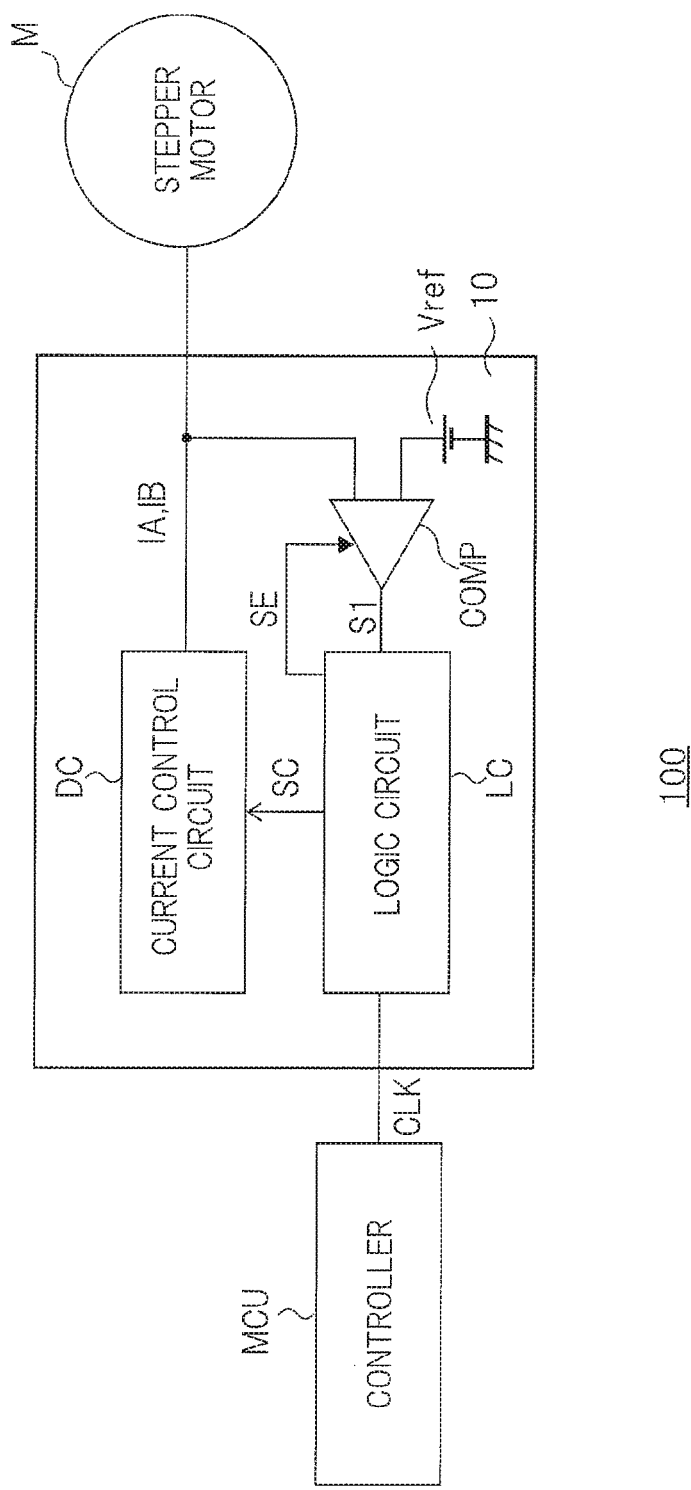
FIG. 1 is a diagram showing an example of a configuration of a stepper motor driver system 100 including a stepper motor driver circuit 10 according to a first embodiment.
Figure 2:
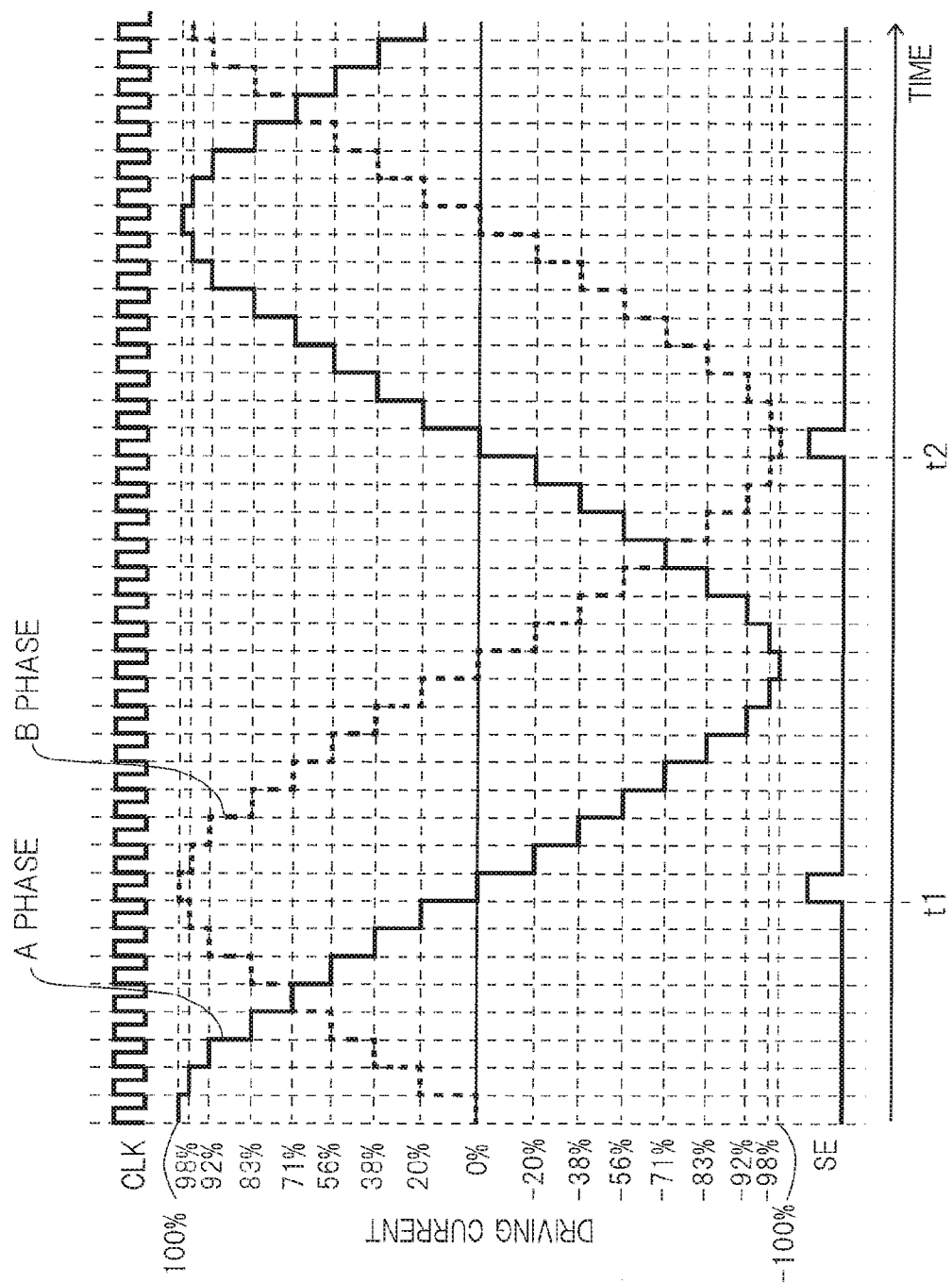
FIG. 2 is a waveform diagram showing waveforms of a reference clock signal "CLK", a driving current having a pseudo-sinusoidal waveform supplied to a coil of a stepper motor "M" and an enable signal "SE"

FIG. 1 is a diagram showing an example of a configuration of a stepper motor driver system 100 including a stepper motor driver circuit 10 according to a first embodiment. FIG. 2 is a waveform diagram showing waveforms of a reference clock signal "CLK", a driving current having a pseudo-sinusoidal waveform supplied to a coil of a stepper motor "M" and an enable signal "SE". FIG. 2 shows an example in which a driving current is supplied to coils of two different phases (A phase and B phase). In the example shown in FIG. 2, for the sake of simplicity, only the enable signal "SE" for the driving current of the A phase is shown, and the enable signal "SE" for the driving current of the B phase is not shown. The following description will be focused on a driving current "IA" of the A phase. However, the description of the driving current of the A phase holds true for the driving current of the B phase and other driving currents of different phases.

As shown in FIG. 1, the stepper motor driver system 100 includes a controller "MCU", the stepper motor "M" and the stepper motor driver circuit 10.

The stepper motor "M" has a stator (not shown) and a rotor (not shown), the stator includes a plurality of coils forming an electromagnet, and the rotor includes a magnet.

The controller "MCU" outputs the reference clock signal "CLK" and a command signal (a signal that prescribes the rotational speed, the phase, the torque or the like of the stepper motor "M") to the stepper motor driver circuit 10.

The stepper motor driver circuit 10 controls driving of the stepper motor "M" in response to the reference clock signal "CLK" and the command signal received from the external controller "MCU".

As shown in FIG. 1, the stepper motor driver circuit 10 includes a current control circuit "DC", a comparator "COMP" and a logic circuit "LC", for example.

The logic circuit "LC" outputs a control signal "SC" based on the reference clock signal "CLK" and the command signal input from the outside (the controller "MCU") and a comparison result signal "S1" received from the comparator "COMP".

The logic circuit "LC" outputs the enable signal "SE" to the comparator "COMP", and the enable signal "SE" activates a comparison operation of the comparator "COMP" in a period in which the driving current "IA" is zero A (zero %).

The comparator "COMP" performs the comparison operation when the driving current "IA" is zero A, that is, when the enable signal "SE" is active. The comparator "COMP" compares a measurement value of an exciting voltage on a coil of the stepper motor "M" and a preset threshold "Vref" and outputs the comparison result signal "S1" based on the comparison result to the logic circuit "LC".

For example, if the measurement value of the exciting voltage on the coil at the time when the driving current "IA" is zero A is lower than the threshold described above, it is determined that the phase of an induced voltage of the coil is advanced with respect to a desired phase (in other words, the driving current supplied is causing the stepper motor "M" to generate a torque equal to or greater than a desired value).

If the measurement value of the exciting voltage applied to the coil when the driving current "IA" is zero A is equal to or higher than the threshold described above, it is determined that the phase of the induced voltage of the coil is lagged with respect to the desired phase (in other words, the driving current supplied is causing the stepper motor "M" to generate a torque smaller than the desired value (that is, the driving current is insufficient)).

The desired phase described above is a phase of the exciting voltage on the coil at the time when the torque of the stepper motor "M" is at the desired value.

The current control circuit "DC" controls the driving current "IA" in response to the control signal "SC".

For example, the current control circuit "DC" supplies a driving current "IA" having a pseudo-sinusoidal waveform, which varies stepwise every one period of the reference clock signal "CLK", to the coils of the stator of the stepper motor "M" (FIG. 2).

As described above, the control signal "SC" is a signal based on the reference clock signal "CLK", the command signal input from the outside (the controller "MCU") and the comparison result signal "S1". Thus, the control signal "SC" contains information on the phase of the induced voltage of the coil described above, which is contained in the comparison result signal "S1".

In other words, the current control circuit "DC" makes the waveform of the driving current "IA" vary in response to the information on the phase of the induced voltage of the coil, that is, the comparison result signal "S1", out of synchronization with the clock "CLK".

For example, if the comparison result signal "S1" indicates that the measurement value of the exciting voltage on the coil at the time when the driving current "IA" is zero is lower than the threshold described above, the current control circuit "DC" controls the driving current "IA" to make the pseudo-sinusoidal waveform of the driving current "IA" closer to a sinusoidal waveform.

In other words, when the phase of the induced voltage of the coil is advanced with respect to the desired phase, the current control circuit "DC" controls the driving current "IA" to make the pseudo-sinusoidal waveform of the driving current "IA" closer to a sinusoidal waveform.

In particular, the current control circuit "DC" can control the driving current "IA" to make the pseudo-sinusoidal waveform of the driving current "IA" closer to a sinusoidal waveform in a period shorter than the period of the reference clock signal "CLK" (that is, with a higher resolution than the reference clock signal "CLK").

In the pseudo-sinusoidal wave, which is a sinusoidal wave divided into steps, the step currents (current steps) are interpolated by an analog transition current. By making the current trajectory closer to an analog transition waveform than to a stepwise waveform, the influence of a torque variation in a transition between the steps and of a vibration caused by a lag in magnetic or mechanical response or reaction due to an abrupt electrical change in di/dt can be minimized. As a result, a high frequency noise and a cogging torque can be reduced. The driving current can be controlled not only based on the information on the exciting voltage on the coil but also based on information on the motor rotational speed at the immediately preceding timing (between the preceding two steps or at the preceding electrical angle unit). In this case, the precision of the interpolation of the current trajectory between the steps can be improved, and therefore, a higher noise reduction precision can be achieved.

If the comparison result signal "S1" indicates that the measurement value of the exciting voltage on the coil at the time when the driving current "IA" is zero A is equal to or higher than the threshold described above, the current control circuit "DC" controls the driving current "IA" to increase an average value of the absolute value of the driving current "IA".

In other words, when the phase of the induced voltage of the coil is lagged with respect to the desired phase, the current control circuit "DC" controls the driving current "IA" to increase an average value of the absolute value of the driving current "IA".

In particular, when the phase of the induced voltage of the coil is markedly lagged with respect to the desired phase, the current control circuit "DC" controls the driving current "IA" to make the pseudo-sinusoidal waveform of the driving current "IA" closer to a rectangular waveform.

When the stepper motor "M" is operating, a constant current control is performed on the driving current between the steps of the stepwise driving current. In this process, the duty cycle of the PWM control varies due to the electric power generation effect of the rotation of the stepper motor "M" and the induced electromotive force between the rotor and the stator of the stepper motor "M". An estimated position of the rotor can be computed by monitoring the variation of the duty cycle. Therefore, a parameter indicative of the variation of the duty cycle of the PWM control can be supplementarily used (as a supplementary coefficient) to determine a variation of a reference value of the constant current, thereby improving the precision. As an alternative, the value of the constant current may be used for an auto gain control technique.

In addition, the values of the reactance and the resistance of the stepper motor "M" at the time when the stepper motor "M" is not operating can also be determined. If a system capable of measuring these values at the time of set-up before starting the driving is used in the stepper motor driver circuit 10, the precision of the waveform can be further improved.

Next, operational characteristics of the stepper motor driver circuit 10 configured as described above will be described.

Figure 3:
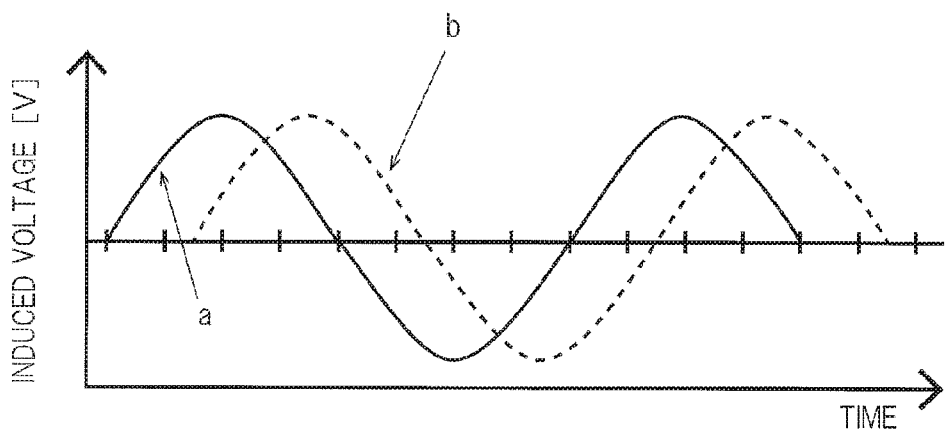
FIG. 3 is a waveform diagram showing an example of the waveform of the induced voltage of the coil in the case where the phase of the induced voltage of the coil is advanced with respect to the desired phase.
Figure 4:
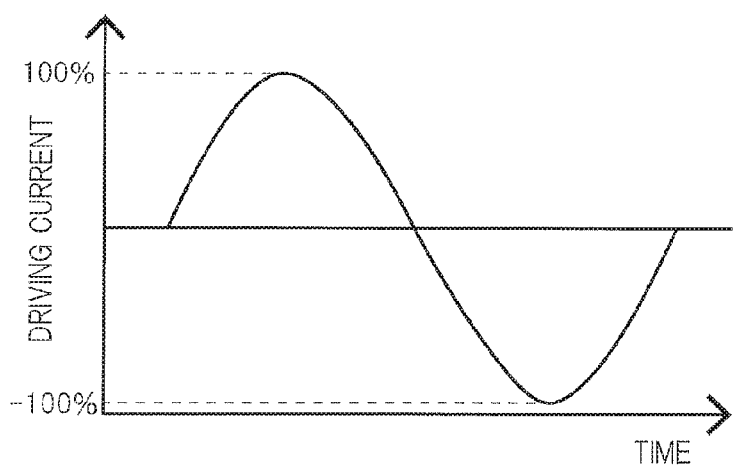
FIG. 4 is a waveform diagram showing an example of the waveform of the driving current output from the current control circuit "DC" in the case where the phase of the induced voltage of the coil is advanced with respect to the desired phase.

FIG. 3 is a waveform diagram showing an example of the waveform of the induced voltage of the coil in the case where the phase of the induced voltage of the coil is advanced with respect to the desired phase. In FIG. 3, reference character "a" denotes a measured waveform of the induced voltage of the coil, and reference character "b" denotes a waveform of the induced voltage with the desired phase. FIG. 4 is a waveform diagram showing an example of the waveform of the driving current output from the current control circuit "DC" in the case where the phase of the induced voltage of the coil is advanced with respect to the desired phase.

For example, if the phase of the induced voltage of the coil is advanced with respect to the desired phase (FIG. 3), the current control circuit "DC" controls the driving current to make the pseudo-sinusoidal waveform of the driving current "IA" closer to a sinusoidal waveform (FIG. 4), as described above.

As a result, the influence of a torque variation in a transition between the steps and of a vibration caused by a lag in magnetic or mechanical response or reaction due to an abrupt electrical change in di/dt can be minimized. As a result, a high frequency noise and a cogging torque can be reduced.

Figure 5:
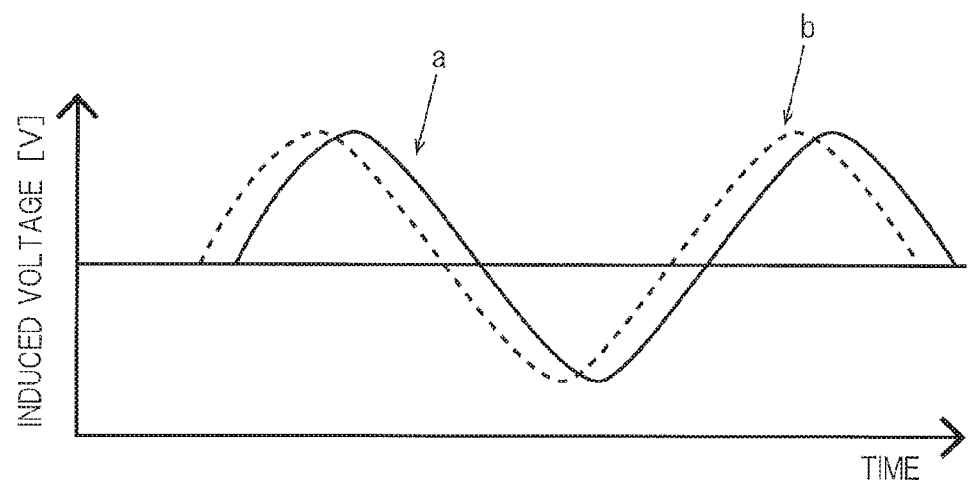
FIG. 5 is a waveform diagram showing an example of the waveform of the induced voltage of the coil in the case where the phase of the induced voltage of the coil is lagged with respect to the desired phase.
Figure 6:
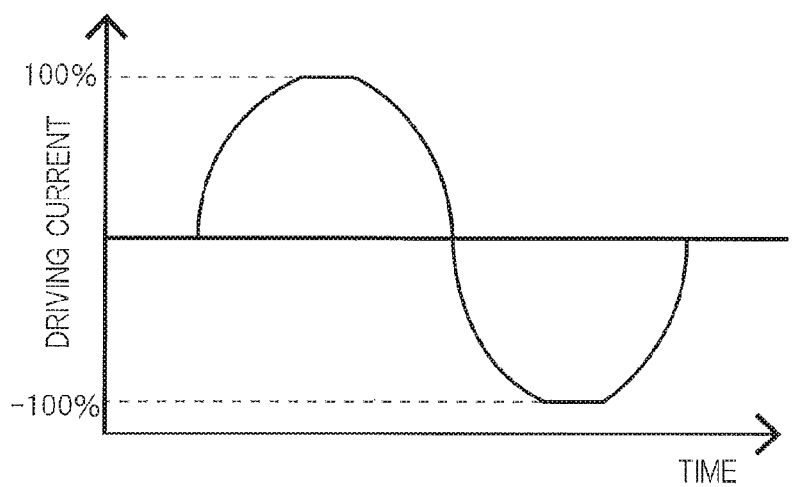
FIG. 6 is a waveform diagram showing an example of the waveform of the driving current output from the current control circuit "DC" in the case where the phase of the induced voltage of the coil is lagged with respect to the desired phase.

FIG. 5 is a waveform diagram showing an example of the waveform of the induced voltage of the coil in the case where the phase of the induced voltage of the coil is lagged with respect to the desired phase. In FIG. 5, reference character "a" denotes a measured waveform of the induced voltage of the coil, and reference character "b" denotes a waveform of the induced voltage with the desired phase. FIG. 6 is a waveform diagram showing an example of the waveform of the driving current output from the current control circuit "DC" in the case where the phase of the induced voltage of the coil is lagged with respect to the desired phase.

For example, if the phase of the induced voltage of the coil is lagged with respect to the desired phase (FIG. 5), the current control circuit "DC" controls the driving current to increase an average value of the absolute value of the driving current "IA" (FIG. 6), as described above. In the example shown in FIG. 6, the driving current is controlled to increase the value of the current in each phase of the pseudo-sinusoidal waveform within an upper limit defined by the amplitude of the driving current yet to be changed.

As a result, the driving current supplied to the stepper motor "M" increases, so that the torque can be increased and brought closer to the desired value described above. That is, the vibration of the stepper motor "M" due to insufficient torque can be reduced.

Figure 7:
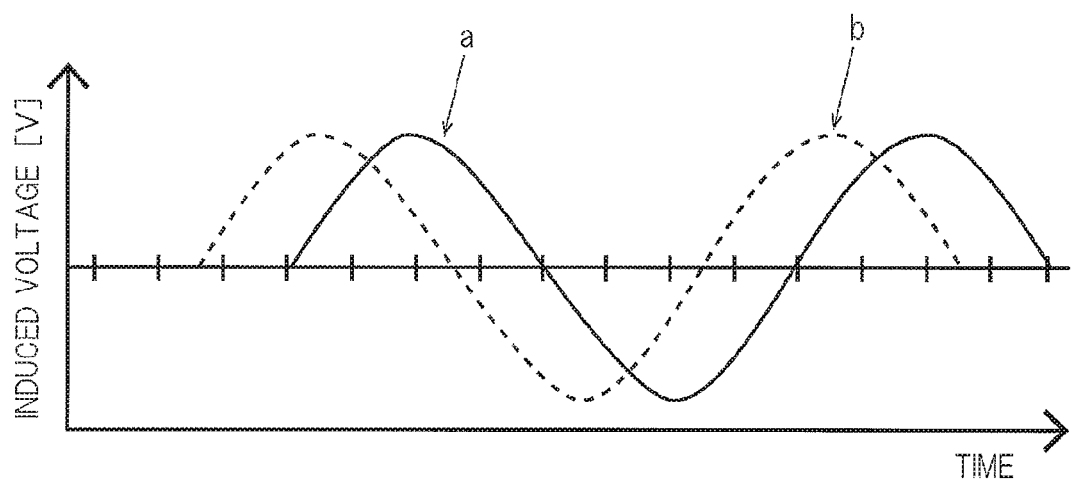
FIG. 7 is a waveform diagram showing an example of the waveform of the induced voltage of the coil in the case where the phase of the induced voltage of the coil is markedly lagged with respect to the desired phase.
Figure 8:
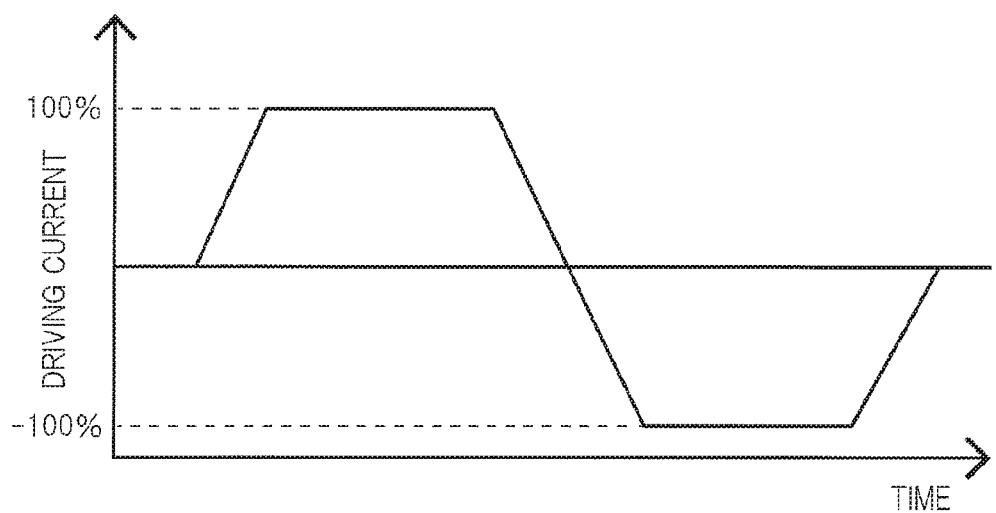
FIG. 8 is a waveform diagram showing an example of the waveform of the driving current output from the current control circuit "DC" in the case where the phase of the induced voltage of the coil is markedly lagged with respect to the desired phase.

FIG. 7 is a waveform diagram showing an example of the waveform of the induced voltage of the coil in the case where the phase of the induced voltage of the coil is markedly lagged with respect to the desired phase. In FIG. 7, reference character "a" denotes a measured waveform of the induced voltage of the coil, and reference character "b" denotes a waveform of the induced voltage with the desired phase. FIG. 8 is a waveform diagram showing an example of the waveform of the driving current output from the current control circuit "DC" in the case where the phase of the induced voltage of the coil is markedly lagged with respect to the desired phase.

As described above, the current control circuit "DC" controls the driving current "IA" to make the pseudo-sinusoidal waveform of the driving current "IA" closer to a rectangular waveform. In the example shown in FIG. 8, the driving current is controlled to provide a trapezoidal waveform within an upper limit defined by the amplitude of the driving current yet to be changed.

As a result, the driving current supplied to the stepper motor "M" further increases, so that the torque can be further increased and brought closer to the desired value described above. That is, the vibration of the stepper motor "M" due to insufficient torque can be reduced with higher reliability.

As described above, the current control circuit "DC" makes the waveform of the driving current "IA" vary not only based on the driving current "IA" having the pseudo-sinusoidal waveform that depends on the clock "CLK" and the command signal but also based on the comparison result signal "S1" (the phase of the induced voltage of the coil).

In the examples shown in FIGS. 4, 6 and 8, the current control circuit "DC" controls the amplitude of the waveform of the driving current "IA" to be the same before and after the waveform of the driving current "IA" changes, Alternatively, the current control circuit "DC" may control the amplitude of the waveform of the driving current "IA" to be different before and after the waveform of the driving current "IA" changes.

As described above, the stepper motor driver circuit 10 drives the stepper motor "M" in such a manner that the gain of the driving current can automatically vary on a constant current table optimal for the environment in which the stepper motor "M" is driven.

Furthermore, the sinusoidal waveform may be additionally corrected to an optimal waveform required by the motor (such as by slightly expanding the sinusoidal waveform toward two-phase excitation or distorting or recessing an apex part of the sinusoidal waveform). This enables low-noise driving in a wider range.

As described above, the driving current is controlled to be suitable for the environment in which the stepper motor "M" is driven (such as the required torque), and the stepper motor "M" is driven in such a manner that the gain of the driving current can automatically vary. As a result, a highly efficient control (a highly efficient operation with an optimal waveform that provides a required torque at a required time) and noise reduction can he achieved at the same time.

As described above, the stepper motor driver circuit according to this first embodiment can reduce vibration when driving the stepper motor.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A stepper motor driver circuit that controls driving of a stepper motor, comprising:
    a current control circuit that supplies a driving current having a pseudo-sinusoidal waveform that varies stepwise every one period of a reference clock signal to a coil of the stepper motor;
    a comparator that compares an exciting voltage of the coil at a time when the driving current is zero and a threshold and outputs a comparison result signal; and
    a logic circuit that outputs a control signal based on the reference clock signal and a command signal input from an outside,
    wherein the current control circuit controls the driving current in response to the control signal, and
    wherein the stepper motor driver circuit generates the driving current having the pseudo-sinusoidal waveform that varies stepwise every one period of a reference clock signal and makes the waveform of the driving current vary in response to a measurement value of the exciting voltage on the coil of the stepper motor at the time when the driving current is zero.

2. The stepper motor driver circuit according to claim 1, wherein the current control circuit
controls the driving current to increase an average value of an absolute value of the driving current in a case where the comparison result signal indicates that the measurement value is equal to or greater than the threshold.

3. The stepper motor driver circuit according to claim 2, wherein the current control circuit
controls the driving current to make the pseudo-sinusoidal waveform of the driving current closer to a sinusoidal waveform in a case where the comparison result signal indicates that the measurement value is smaller than the threshold.

4. The stepper motor driver circuit according to claim 3, wherein the current control circuit
controls the driving current to increase the average value of the absolute value of the driving current in a case where a phase of an induced voltage of the coil is lagged with respect to a desired phase.

5. The stepper motor driver circuit according to claim 2, further comprising a logic circuit that outputs a control signal based on the reference clock signal and the command signal input from the outside,
wherein the current control circuit controls the driving current in response to the control signal.

6. The stepper motor driver circuit according to claim 2, wherein the current control circuit
controls the driving current to increase the average value of the absolute value of the driving current in a case where a phase of an induced voltage of the coil is lagged with respect to a desired phase.

7. The stepper motor driver circuit according to claim 6, wherein the current control circuit
controls the driving current to make the pseudo-sinusoidal waveform of the driving current closer to a rectangular waveform.

8. The stepper motor driver circuit according to claim 6, further comprising a logic circuit that outputs a control signal based on the reference clock signal and the command signal input from the outside,
wherein the current control circuit controls the driving current in response to the control signal.

9. The stepper motor driver circuit according to claim 1, wherein the current control circuit
controls the driving current to make the pseudo-sinusoidal waveform of the driving current closer to a sinusoidal waveform in a case where the comparison result signal indicates that the measurement value is smaller than the threshold.

10. The stepper motor driver circuit according to claim 9, wherein the current control circuit
controls the driving current to make the pseudo-sinusoidal waveform of the driving current closer to a sinusoidal waveform in a case where a phase of an induced voltage of the coil is advanced with respect to a desired phase.

11. The stepper motor driver circuit according to claim 9, further comprising a logic circuit that outputs a control signal based on the reference clock signal and the command signal input from the outside,
wherein the current control circuit controls the driving current in response to the control signal.

12. The stepper motor driver circuit according to claim 1, wherein the current control circuit
controls the driving current to make the pseudo-sinusoidal waveform of the driving current closer to a sinusoidal waveform in a case where a phase of an induced voltage of the coil is advanced with respect to a desired phase.

13. The stepper motor driver circuit according to claim 12, wherein the desired phase is a phase of the exciting voltage on the coil at a time when a torque of the stepper motor is at a desired value.

14. The stepper motor driver circuit according to claim 12, wherein the current control circuit
makes the driving current vary in a period shorter than the period of the reference clock signal to make the pseudo-sinusoidal waveform of the driving current closer to a sinusoidal waveform.

15. The stepper motor driver circuit according to claim 12, wherein the current control circuit
controls the driving current to increase an average value of an absolute value of the driving current in a case where the comparison result signal indicates that the measurement value is equal to or greater than the threshold.

16. The stepper motor driver circuit according to claim 15, wherein the current control circuit
controls the driving current to make the pseudo-sinusoidal waveform of the driving current closer to a sinusoidal waveform in a case where the comparison result signal indicates that the measurement value is smaller than the threshold.

17. The stepper motor driver circuit according to claim 12, further comprising a logic circuit that outputs a control signal based on the reference clock signal and the command signal input from the outside,
wherein the current control circuit controls the driving current in response to the control signal.

* * * * *